Oct. 24, 1967

B. B. MATHEWS ETAL 3,348,680

SEGREGATION APPARATUS AND METHOD

Filed Aug. 23, 1965

INVENTORS
BENTLEY B. MATHEWS
PAUL T. FRENTZEN

BY Naylor & Neal

ATTORNEYS

Oct. 24, 1967  B. B. MATHEWS ETAL  3,348,680
SEGREGATION APPARATUS AND METHOD
Filed Aug. 23, 1965  4 Sheets-Sheet 2

INVENTORS
BENTLEY B. MATHEWS
PAUL T. FRENTZEN
BY
Naylor & Neal
ATTORNEYS

United States Patent Office 3,348,680
Patented Oct. 24, 1967

3,348,680
SEGREGATION APPARATUS AND METHOD
Bentley B. Mathews, P.O. Box 335, Arbuckle, Calif. 95912, and Paul T. Frentzen, Arbuckle, Calif.; said Frentzen assignor to said Mathews
Filed Aug. 23, 1965, Ser. No. 481,847
24 Claims. (Cl. 209—84)

ABSTRACT OF THE DISCLOSURE

An apparatus and method for segregating heterogeneous articles according to size comprising, in part, a continuous belt having openings therein through which articles of a predetermined size or less are adapted to pass. In the preferred embodiment, the belt is continuously driven to effect translation of its upper reach and controlled oscillating and damping of the upper reach is effected simultaneously with its translation. Articles to be segregated are deposited on the upstream end of the upper reach of the belt and collection is effected beneath the upper reach. The apparatus is also concerned with an arrangement wherein a plurality of such belts are disposed in stacked relationship so that oversized articles received on the upper reach of each of the belts above the lowermost in the arrangement are cascaded onto the upstream end of the upper reach of the belt directly therebeneath. The preferred embodiment of the apparatus also employs loading plates and/or ejector belts disposed beneath the upper reach of the continuous belt or belts employed therein to prevent lodging and effect ejection of articles in its openings.

---

This invention relates to an apparatus and method adapted to segregate articles and particularly is directed to such an apparatus and method adapted to perform the functions of classification, gradation and/or separation on the basis of article size. The invention is especially effective in that it is adapted to perform its functions both on articles of regular shape, such as peas and filbert nuts, and on articles of irregular shape, such as beans and shelled or unshelled nuts of the almond, brazil, pecan, walnut, etc. variety. In the processing of articles of irregular shape, such as shelled almonds, the invention is particularly effective in that it is adapted to perform its functions on the basis of the end and edge dimensions of the articles, as contrasted to the major side dimensions thereof.

Classification in the sense used herein refers to the roughest step of segregation wherein the product being processed is typically broken down simply to change the relative proportions of its components in preparation for further gradation and/or separation. In a complete segregation process, the classification step is particularly advantageous in that it greatly increases the efficiency of the gradation and/or separation steps following thereafter.

Gradation, as used herein, is the segregation step which typically follows classification wherein the product being processed is segregated as to count by size. Through such a gradation step, the product being processed is broken down into units per measure of weight or volume.

Separation, as used herein, is the segregation step which typically follows the gradation step. In this step the product is generally processed to a point wherein the components thereof are in condition for a specific use. This use may vary considerably, depending upon the particular process involved and the component being considered. For example, in a nut segregation process, it is possible that after separation certain components may be in condition for final packing, while other components may be in condition for "throw-away" to waste.

The foregoing definitions of the steps of classification, gradation and separation are intended simply to illustrate alternative segregation functions which may be accomplished through utilization of the present invention. These functions are not intended to be limiting on the various segregation uses for which the invention may be employed. It is noted that these steps differ from each other primarily in degree and that the definition given a particular step will be dependent on the characteristics of the overall process in which it is used. For example, in a very rudimentary process, the step of separation might, in a physical sense, correspond to the step of classification of a more refined process. Thus, it is possible that after a product has been carried through the steps of classification, gradation and separation in a rudimentary process, it may be desirable to feed the product directly to and through the same sequence of steps in a second more refined process. It is also noted that although each of these steps may be accomplished through utilization of the present invention, it is possible that in certain instances it may be desirable to carry out selected steps through the utilization of other techniques.

In the prior art, various apparatuses and methods have been provided to effect the segregation of articles on the basis of size. Typical among these are those which employ continuous belts upon which articles to be graded are loaded, which belts are provided with openings through which articles of a predetermined size or less are adapted to pass. In operation, articles are conveyed by movement of the belt and gradually those of the predetermined size or less fall through the openings in the belt into a suitable receptacle. Oversized articles are discharged from the downstream end of the belt and, if desired, conveyed to additional similar belts for further segregation. In apparatuses and methods of this type, articles are generally segregated according to the dimensions of their major or largest side, since this is the side upon which the articles tend to rest on the belt.

In the segregation of other than perfectly spherical articles, prior art apparatuses and methods of the type described above have the disadvantage that segregation is dependent on the incidental orientation which an article may assume on the belt. Although this orientation is generally such that the largest side of the article rests against the belt and, accordingly, segregation is controlled by the dimensions of this side, it can be appreciated that frequently articles may assume other orientations. For this reason, the consistent segregation of other than perfectly spherical articles with such apparatuses and methods has proved, as a practical matter, impossible. These prior art apparatuses and methods also have the disadvantage that they are not well facilitated to segregate fragile articles, such as shelled nuts. This results because no effective means has been provided to gently and effectively eject articles lodged in the openings of the belts.

Another disadvantage of the aforedescribed prior art apparatuses and methods is that they require considerable space when belts are arranged in series to effect multiple segregation. This results because the belts are typically arranged in end to end relationship with the discharge of one belt directed to the loading end of the next successive belt.

It is, accordingly, a principal object of the present invention to provide a belt-type segregator to effect classification, gradation and/or separation steps while avoiding the disadvantages of prior art apparatuses and methods of the type described above.

Another object of the invention is to provide a belt-type segregator capable of uniformly segregating non-spherical articles. With respect to this object, it is another object of the invention to provide such a device which effects segregation in accordance with the minor dimensions of the articles being processed.

A further and more specific object of the invention is to provide a belt-type segregator wherein the reach of the belt being utilized for segregation is oscillated or vibrated to effect orientation of the articles thereon. With respect to this object, it is a related object to provide for the selective control of the amplitude and frequency of oscillations or vibrations imparted to this reach.

Another object of the invention is to provide a belt-type segregator capable of increased processing speeds. With respect to this object, it is another object to provide a belt-type segregator wherein the segregating belt or belts are continuously maintained in a clean state to optimize the efficiency thereof.

Still another object of the invention is to provide a construction to facilitate the gentle and effective ejection of articles lodged in the openings of a belt employed in a belt-type segregator.

Still another specific object of the invention is to provide a compact belt-type segregator capable of accurately segregating a product into multiple components. With respect to this object it is a related object to provide a segregator wherein a heterogeneous conglomeration of similar and dissimilar shapes may be classified generally by shape to increase the percentage composition of one or more of the components.

Yet another object of the invention is to provide a belt-type segregator suitable for use in combination segregation processes incorporating other types of equipment, such as gravity tables. With respect to this object, it is another and related object to provide a segregator ideally suited to increase the efficiency of other segregating and related equipment which may be used in combination therewith.

In one of its broadest aspects, the present invention comprises a method and construction to impart controlled vertical oscillations or vibrations to the article-supporting reach of a continuous segregating belt simultaneously with the longitudinal translation thereof. The construction includes belt-engaging oscillation or vibration imparting elements and belt-engaging damping elements adapted to be adjusted as to their position relative to each other and the belt. In another of its aspects, the invention includes a belt-engageable ejection element disposed in juxtaposed relationship to the article-supporting reach of the belt adjacent its discharge end, which element moves beneath the reach at a velocity corresponding to that of the belt and is so arranged to effect article ejection without shearing or crushing. Other aspects, the foregoing and other objects and the detailed characteristics of the invention will become more apparent when viewed in light of the exemplary embodiment thereof illustrated and described with respect to the accompanying drawings, wherein:

Figures 1, 2, 3, 4:
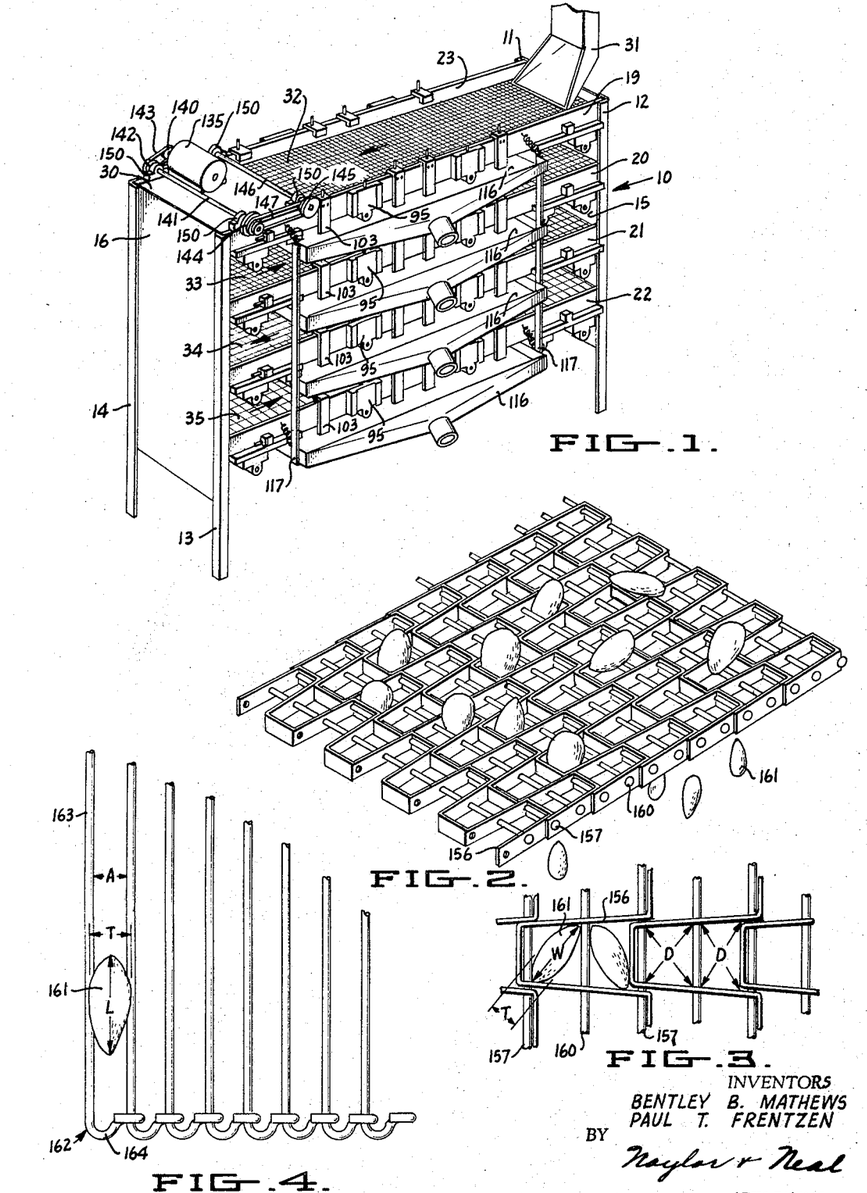
FIG. 1 is a perspective view illustrating the exemplary embodiment of the inventive segregator in its entirety.
FIG. 2 is a perspective view illustrating a segment of the preferred type of continuous belt utilized in the FIG. 1 segregator and the manner in which almonds or similarly shaped articles are graded therethough.
FIG. 3 is a plan view showing a portion of the FIG. 2 belt in enlarged form.
FIG. 4 is a plan view showing a segment of an alternative type of belt to be used in the FIG. 1 segregator and further showing the typical orientation of an almond or similarly shaped article thereon.

Referring now to FIG. 1 in detail, the segregator illustrated therein is designated in its entirety by the numeral 10 and is shown in its normal upright position in condition to commence segregation. The segregator 10 includes a support frame comprised of vertically disposed legs 11, 12, 13, and 14, tied together by end plates 15 and 16 and side supports 19, 20, 21, 22, 23, 24, 25, and 26. The supports 24, 25, and 26 can be seen in FIG. 12. The basic support frame structure is completed by a plate 30 extending between the side supports 19 and 23 at one end thereof. At the opposite end of the support frame, a loading chute 31 extends between the supports 19 and 23. Although this chute is supported by ancillary structure (not illustrated), it is to be understood that is could be mounted directly on the support frame if so desired.

The support frame has extending thereacross in horizontally spaced vertically disposed relationship a plurality of continuous segregation belts 32, 33, 34 and 35. These belts correspond to each other in their dimensional characteristics of length and width, but differ in the size of sorting or grading openings provided therein. Specifically, the uppermost belt 32 is provided with the smallest segregation openings and the lower belts 33, 34 and 35 are provided with progressively larger segregation openings. The detailed construction of the belts and their operation to effect segregation will become more apparent from the subsequent discussion. It is to be understood that this progressive arrangement of belts is merely illustrative of one preferred construction adapted for use in the segregation of shelled almonds and that other constructions may be employed. For example, in some instances it may be desirable to provide progressive belts with differently shaped openings, rather than openings differing only in size. The particular belt construction and arrangement employed will depend primarily on the product being segregated.

Each of the belts 32–35 is supported on the support frame through similar structure. For the sake of simplicity, this structure will only be described in detail with reference to the belt 34 illustrated in FIGS. 5 and 6 and corresponding structure for the remaining belts will be designated by like reference numerals. From the motion indicating arrow lines on the belts in FIG. 1, it will be seen that the successive belts move in opposite directions. Furthermore, as will be developed in detail subsequently with respect to FIG. 12, the support structure for each belt is oppositely disposed to effect preferred loading and discharge characteristics. These differences do not, however, affect the detailed construction of the structure supporting each belt.

Figure 5:
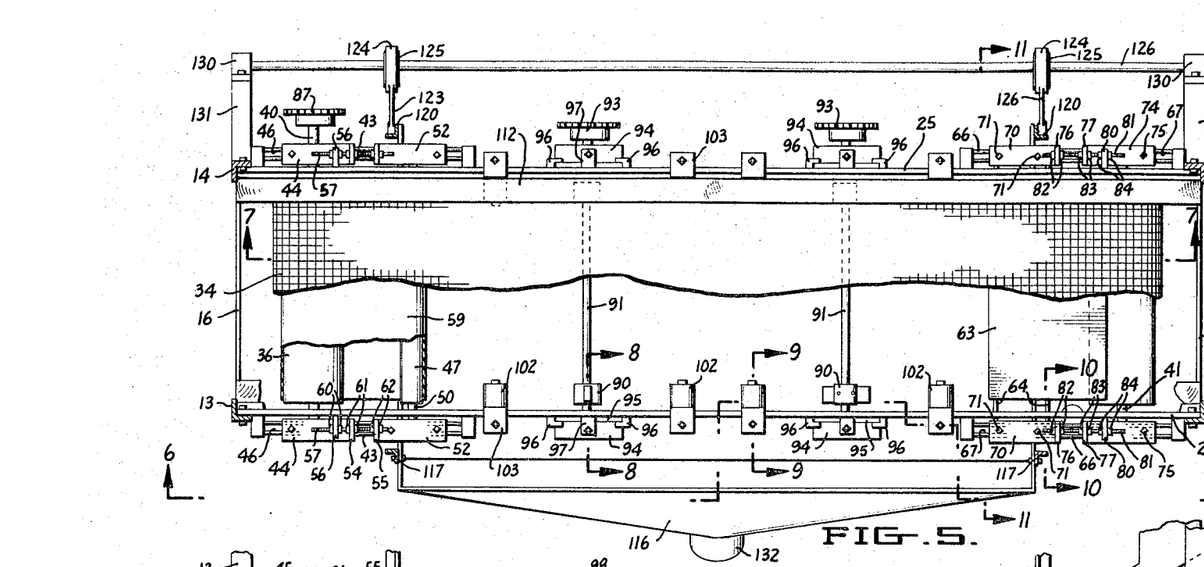
FIG. 5 is a plan view, partially in section, illustrating one stage of the FIG. 1 segregator.
Figure 6:
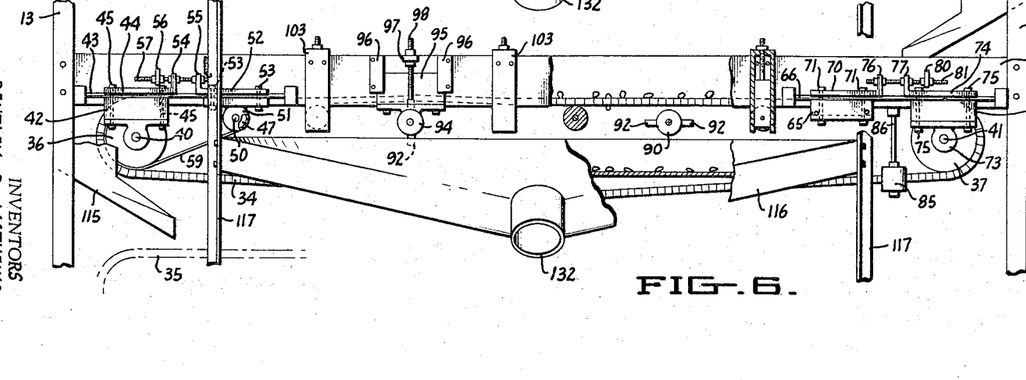
FIGS. 6 and 7 are sectional views taken on vertical planes 6—6 and 7—7, respectively, of FIG. 5.

Referring now to FIGS. 5 and 6, the belt 34 is shown therein as being trained around horizontally spaced drums 36 and 37. The drums 36 and 37 are supported for rotational movement about their parallel axes by axially extending shafts 40 and 41, respectively, fixed thereto and extending laterally therefrom. The shaft 40 is journaled between the side supports 21 and 25 through means of bearing brackets 42 slidably mounted on rails 43 fixed to the side supports. The bearing brackets are secured to the rails 43 for slidable movement therealong by suspension plates 44 disposed above the rails and through bolts 45 extending between the brackets and support plates through longitudinal slots 46 in the rails.

The support for the belt 34 at the end thereof trained around the drum 36 is completed by an intermediate drum 47 mounted between the side supports 21 and 25 with the upper surface thereof in substantially the same horizontal plane as the upper surface of the drum 36. The latter relationship can best be seen from FIG. 7. The intermediate drum 47 is supported for rotational movement about an axis parallel to that of the drum 36 by a shaft 50 fixed thereto and extending laterally therefrom. The shaft 50 is journaled for rotational movement between a pair of bearing brackets 51 received on the opposite ends thereof. These bearing brackets are, in turn, supported on the rails 43 through structure corresponding substantially to that used for the support of the brackets 42, including: suspension plates 52 and through bolts 53. The latter bolts extend slidably through the slots 46 and are secured between the bearing bracket 51 and suspension plate 52.

Adjustment of the drums 36 and 47 relative to the side supports 21 and 25 and relative to each other is provided by structure facilitating the selective movement of the suspension plates 44 and 52 along the rails 43, either together as a unit or individually. This structure comprises: ears 54 and 55 fixed to and extending upwardly from the support plates 44 and 52, respectively; ears 56 fixed to and extending outwardly from the side supports 21 and 25; threaded shafts 57 extending slidably through aligned openings in said ears; nuts 60 threadably received on the shafts 57 on either side of the ears 56; nuts 61 threadably received on the shafts 57 on either side of the ears 54; and, nuts 62 threadably received on the shafts 57 on either side of the ears 55. With this construction, to effect adjustment of the drums 36 and 47 as a unit, without disturbing the adjustment of the distance therebetween, it is merely necessary to move the shafts 57 through turning of the nuts 60 while maintaining the nuts 61 and 62 in fixed position on the shafts. In a like manner, to adjust the distance between the drums 36 and 47, without disturbing the adjustment of the drum 36 on the side support frame, it is merely necessary to move the ears 55 by turning the nuts 62 while maintaining the nuts 60 and 61 in fixed position on the shafts 57. Adjustment of the drum 36 on the side supports 21 and 25 without disturbing the adjustment of the drum 47 can similarly be effected by moving the ears 54 through turning of the nuts 61 while maintaining the nuts 60 and 62 in fixed position on the shafts 57.

The drum 47 is provided so that an intermediate continuous ejection belt 59 may be supported in juxtaposition to the lower surface of the segregation belt 34 adjacent the discharge end thereof. As can be seen from FIG. 6, the intermediate belt 59 is trained around the drums 36 and 47 and is interposed between said drums and the lower surface of the belt 34. The purpose of this arrangement is to effect ejection of articles from the segregation belt 34 without the crushing or shearing thereof. The latter action is avoided because the small radius of the drum 47 and the intermediate belt trained directly thereover functions to eject articles from the segregation belt with far less squeezing and shearing action than would occur with a belt or drum of a larger radius, such as the drum 36. This characteristic can best be seen from the illustration of FIG. 7. To obtain optimum ejection results with the intermediate belt 59, it is preferable that the drum 47 have a radius of one-half or less that of the drum 36. It has also been found preferable to fabricate the belt 59 of rubber or some other flexible material impermeable to the article being graded.

From the interrelationship of the drums 36 and 47 and the belts trained thereover, the advantages of the aforedescribed independent adjustment structure are evident. Specifically, this structure provides for the tension adjustment of either one of the belts 34 or 59 without affecting the adjustment of the other; or for simultaneous tension adjustment of both belts.

The end of the belt 34 trained around the drum 37 has disposed immediately below the upper reach thereof a plate 63. From the following discussion, it will be seen that articles to be segregated are loaded onto the belt above this plate and that the plate functions to minimize lodging of articles in the belt openings during loading. The plate 63 is supported by rods 64 extending beneath the side supports 21 and 25 (see FIG. 10), which rods are in turn adjustably supported by a structure corresponding substantially to that supporting the intermediate drum 47. This structure comprises: bearing brackets 65 secured to the ends of the rods 64; rails 66 fixedly secured to the side supports 21 and 25 and having slots 67 extending longitudinally therethrough; suspension plates 70 slidably received on the rails 66 above the brackets 65; and, through bolts 71 extending slidably through the slots 67 into secured engagement with the brackets 65 and plates 70. As an alternative to the plate 63, it is also possible to mount an intermediate belt, corresponding to the belt 59, adjacent the drum 37 for cooperation therewith in a manner corresponding to that of the belt 59 with the drum 36. Such an alternative intermediate belt would also function to minimize lodging of articles in the belt 34 during loading and would have the advantage of being self cleaning due to its continuous movement.

The drum 37 is secured between the side supports 21 and 25 through a structure corresponding substantially to that used for the drum 36. This structure comprises bearing brackets 72 supporting journals 73 in which the ends of the shaft 41 are rotatably received; suspension plates 74 slidably received on the rails 66 above the brackets 72; and, through bolts 75 extending slidably through the slots 67 into secured engagement with the brackets 72 and plates 74.

Selective simultaneous or independent adjustment of the drum 37 and plate 63 is provided through a structure corresponding substantially to that of the aforedescribed adjustment structure for the drums 47 and 36. This adjustment structure comprises: ears 76 and 77 fixed to and extending upwardly from the suspension plates 70 and 74, respectively; ears 80 fixed to and extending outwardly from the side supports 21 and 25 in alignment with the ears 76 and 77; threaded shafts 81 extending slidably through aligned openings in the ears 76, 77 and 80; nuts 82 threadably received on the shafts 81 on either side of the ears 76; nuts 83 threadably received on the shafts 81 on either side of the ears 77; and, nuts 84 threadably received on the shafts 81 on either side of the ears 80. Through this arrangement, adjustment of the drum 37 and plate 63 as a unit on the side supports 21 and 25 is effected by moving the shafts 81 through turning of the nuts 84 while maintaining the nuts 82 and 83 in fixed position on the shafts. Movement of the drum 37 independent of the plate 63 is effected by turning the nuts 83 on the shafts 81 while maintaining the nuts 83 and 84 in fixed position on the shafts.

Figure 10:
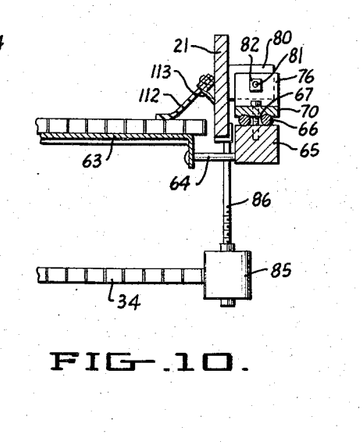

From the foregoing, it will be appreciated that the adjustment structure cooperating with the drums 36 and 37 facilitates both tension adjustment and longitudinal centering of the segregation belt 34. Transverse centering of the belt 34 on the drums 36 and 37 is provided by lateral rollers 85, one of which is illustrated in FIGS. 6 and 10. Although only one of the rollers 85 is illustrated, it is to be understood that a plurality of such rollers may be provided and that their locations may be selectively varied. It has been found particularly desirable to mount the lateral centering rollers in transverse alignment with heater elements, the details of which latter elements will be developed subsequently. These rollers are adjustably mounted for rotational movement on rods 86 secured to the frame side supports. As can best be seen from FIG. 10, the rollers 85 engage the edges of the belt 34 and are mounted for rotational movement about the axes of the rods 86. It has been found particularly desirable to mount the rollers for engagement with the lower reach of the belt 34 at approximately the midpoint thereof.

In addition to providing for the centering of the belts through the provision of lateral rollers, such as the rollers 85, it is also possible to provide for centering of the belts 34 and 59 by crowning the drums 36, 37 and 47 over which they are trained. Centering through this crowning provision may be either as an addition or alternative to the provision of lateral rollers.

From the foregoing description, it can be seen that the drums 36, 37 and 47 and the plate 63 support the upper reach of the belt 34 for rectilinear movement. This rectilinear movement is imparted by driving the drum 36 through means of a sprocket 87 mounted on the support shaft 40. This sprocket, as will be developed subsequently, is chain driven.

In addition to the aforedescribed structure to facilitate rectilinear movement of the upper reach of belt 34, structure is also provided to impart controlled vertical oscillations or vibrations to this reach. This structure comprises beater elements 90 fixed to axles 91 disposed beneath and extending transversely across the upper reach of the belt 34. Each of the beater elements 90 has fixed thereto and extending radially therefrom flexible paddles 92 of rubber or the like, which paddles are adapted to engage the upper reach of the belt 34 and impart vertical movement thereto upon rotation of the axles 91. The latter motion is exemplified in FIG. 7. Rotational movement is imparted to the axles 91 through means of chain driven sprockets 93 fixed to one end thereof.

Figure 8:
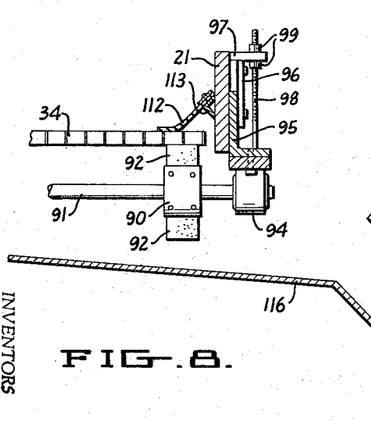
FIGS. 8, 9, 10 and 11 are sectional views taken on vertical planes 8—8, 9—9, 10—10 and 11—11, respectively, of FIG. 5.

The axles 91 are journaled at the ends thereof in bearings 94, which bearings are in turn adjustably secured to the side supports 21 and 25 for movement towards and away from the upper reach of the belt 34. The structure securing the bearings 94 to the side supports comprises: vertically disposed plates 95 fixed to the bearings 94; angles 96 fixed to the side supports 21 and 25 and defining therewith channels to slidably receive the plates 95; ears 97 fixed to the side supports above the bearings 94; threaded studs 98 fixed to the plates 95 and extending upwardly therefrom and slidably through openings (not illustrated) in the ears 97; and, nuts 99 threadably received on the studs 98 on either side of the ears 97. With this arrangement, as is best illustrated in FIG. 8, raising and lowering of the bearings 94 is effected simply by adjusting the position of the nuts 99 on the studs 98.

The energy level of the oscillations or vibrations imparted to the upper reach of the belt 34 is controlled, in part, by the following: the tension of the belt (as effected by adjustment of the drums 36 and 37); the diameter of the beater elements 90 as defined by the paddles 92 extending radially therefrom; and, the vertical disposition of the bearings 94 (as effected by the support structure therefor). The frequency of oscillations or impulses is, naturally, controlled by the r.p.m. of the beater elements and their phase relationship. It is noted that the phase relationship of the beater elements can be selectively varied and that, for purposes of illustration, the beater elements are shown as being approximately 90° out of phase (see FIG. 7).

Figure 9:
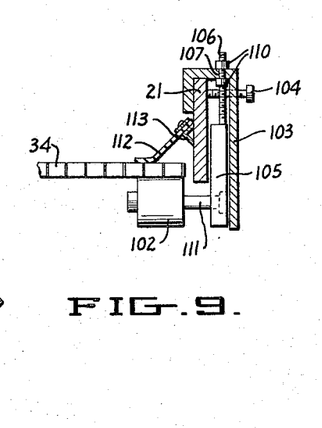

To further effect the energy level control of impulses or oscillations imparted to the upper reach of the belt 34, rollers 102 are provided. These rollers are adjustably supported on the side supports 21 and 25 beneath and in engagement with said reach at spaced locations from the beater elements 90. The structure supporting each of the rollers 102 can best be seen in FIG. 9 and comprises: an inverted channel 103 curved over the side support juxtaposed thereto; a pair of set bolts 104 threadably received in one side of the channel 103 for engagement with the side support; a support plate 105 slidably received between one side of the channel 103 and the side support; a threaded stud 106 fixed to the support plate 105 and extending slidably through an opening 107 in the channel 103; a pair of cuts 110 threadably received on the stud 106 on either side of the channel 103; and, an axle 111 fixed at one end to the plate 102 and having rotatably received on the other end the roller 102. Through this arrangement, the distance between the beater elements 90 and the rollers 102 may be selectively varied by simply sliding the channel 103 along the side support juxtaposed thereto to any desired location and then tightening the set bolts 104. Movement of the rollers 102 vertically towards and away from the upper reach of the belt 34 is effected simply by adjusting the position of the nuts 110 on the stud 106. The latter movement, naturally also affects tension adjustment of the belt 34.

Attention is now directed to the location of the beater elements 90 and rollers 102 relative to the upper reach of the belt 34. Specifically, it is noted that the beater elements and rollers only extend beneath the lateral edge portions of the reach. Accordingly, articles which may extend through the openings in the belt intermediate these edge portions cannot be contacted or damaged by the rollers and beater elements. Although this arrangement is preferred for the processing of fragile articles, it is to be understood that the beater elements 90 and/or rollers 102 may extend completely across the upper reach of the belt 34 where it is found that the articles being processed are not so fragile as to be damaged by contact therewith.

To assure that articles are not damaged by the roller and beater elements at the lateral edge portions of the belt 34, longitudinally extending shields 112 are mounted on the side supports 21 and 25 so as to extend over these edge portions. The shields 112 are fabricated of a resilient material, such as rubber or the like, so as to permit substantially unrestricted oscillation of the belt responsive to the beater elements 90, while at the same time maintaining their contact with the belt. In the preferred form illustrated, the shields 112 are secured to the side supports 21 and 25 so as to extend downwardly therefrom into slidable engagement with the upper reach of the belt 34. Angle elements 113 fixed to the side supports and secured to the shields 112 provide this form of mounting. Through this arrangement, the shields 112 function to isolate articles being segregated from direct contact with the beater elements 90 and rollers 102, and at the same time, to direct articles towards the midportion of the belt 34. It is noted that the shields 112 have a damping effect on the oscillations or vibrations imparted to the belt 34 and that this effect can be selectively controlled by varying the resiliency of the shields and/or their vertical disposition relative to the belt.

Figure 7:
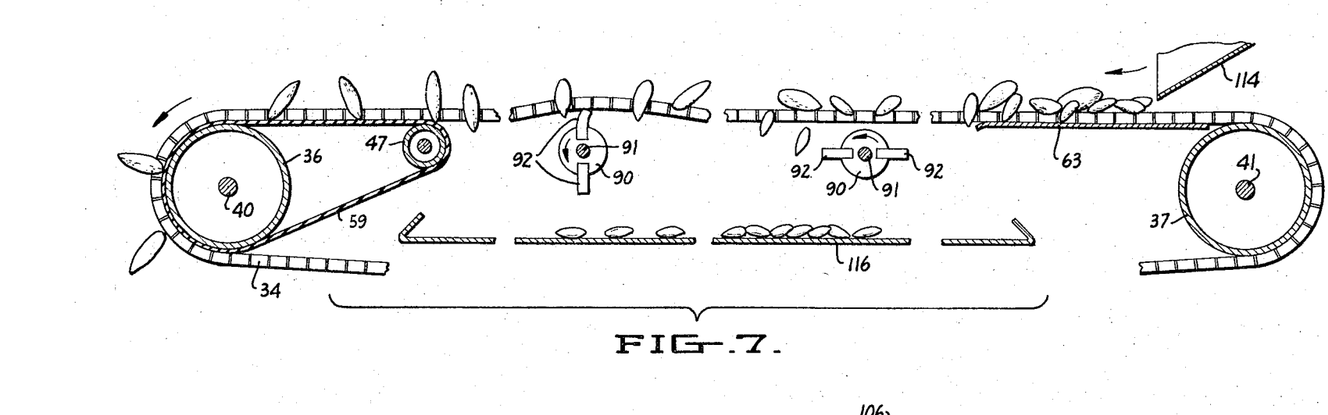

The loading of articles to be graded onto the belt 34 and the discharge of oversize articles therefrom is provided for by chutes 114 and 115 secured to the support frames at the upstream ends, respectively, of the belt. The chute 114, as can best be seen from FIG. 7, is positioned to discharge articles onto the upper reach of the belt 34 above the plate 63. The chute 115 is located below the belt 34 to receive articles discharged therefrom over the drum 36. The chutes 114 and 115 are substantially identical in structure and function. In function, as will become more apparent subsequently, the chute 114 acts as a receiving chute for the belt 33 and a loading chute for the belt 34. In a like manner, the chute 115 acts as a receiving chute for the belt 34 and a loading chute for the belt 35 (see FIG. 6).

Figure 11:
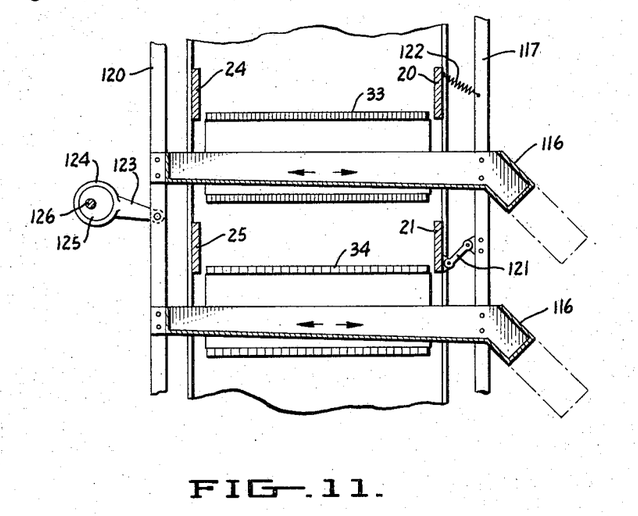

The structure cooperating with the belt 34, as illustrated in FIGS. 5 and 6, is completed by an article receiving tray 116 interposed between the upper and lower reaches of the belt and extending completely thereacross from a position located beneath the plate 63 to a position located beneath the belt 59. Thus, all segregated articles passing through the upper reach of the belt are received in the tray. From this relationship it can be seen that the belt 59 and plate 63 function to direct segregated articles to a localized area, namely that over the tray 116. The tray 116 is supported at one side by vertically disposed angle members 117 and at the other side by vertically disposed angle members 120. The members 117 are flexibly secured to the side supports adjacent thereto, as can be best seen in FIGS. 1 and 11, by links 121 and coil springs 122. The links 121 are disposed at an angle to the horizontal supports and the angle members for rotational movement about substantially parallel horizontal axes. The angle members 120 are flexibly secured to the side supports adjacent thereto through the following structure: links 123 pivotally secured at one end to said angle members for movement about substantially horizontal axes and having formed at the other ends thereof cylindrical bearings 124;

round eccentrics 125 rotatably received within said bearings; an eccentric support shaft 126 fixed to and extending through said eccentrics and having fixed to one end thereof a drive sprocket 127; journals 130 rotatably supporting said support shaft; and, brackets 131 supporting the journals 130 on the legs 11 and 14 (see FIG. 5).

Through the aforedescribed mounting arrangement for the receiving tray 116, rotation of the shaft 126 functions to impart a combined horizontal and vertical oscillation to the tray 116. This results because rotation of the eccentrics 125 functions to impart horizontal movement to the trays, which movement is, in part, converted to vertical movement by the links 121. The purpose of this compound movement is to direct articles received in the tray 116 to a discharge opening 132 formed at one side thereof. Although not illustrated, it is to be understood that this discharge opening may be suitably connected to any receptacle. The feeding of articles to the opening 132 is further facilitated by the slight inclination of the tray downwardly to this opening.

Figure 12:
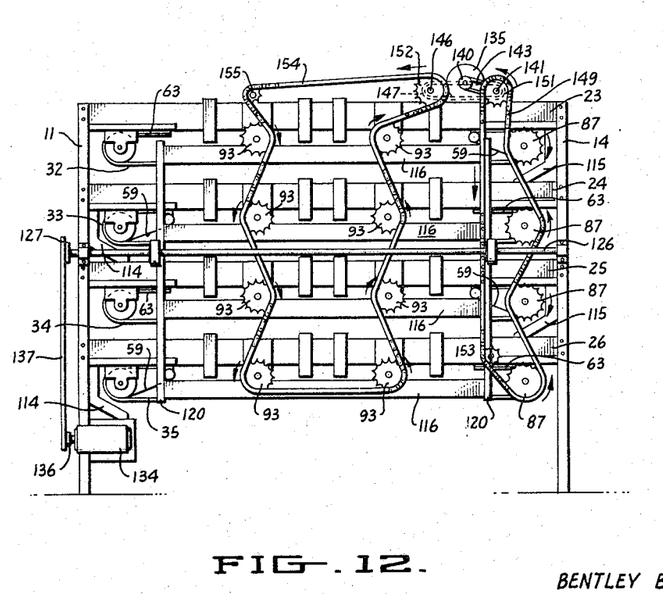
FIG. 12 is an elevational view illustrating the rear side of the FIG. 1 segregator and diagrammatically showing the various elements thereof.

The overall construction of the segregator is best illustrated in FIGS. 1 and 12. From these figures it can be seen that the belts 32–35 are arranged in stacked relationship on the support frame and that adjacent belts are driven in opposite directions (see the arrow lines in FIG. 1). Thus, each belt has its receiving and discharge ends arranged opposite to that of the belt or belts adjacent thereto. This, in turn, requires that adjacent segregating belts have their intermediate ejection belts 59 and plates 63 arranged oppositely, as can best be seen from FIG. 12. The result of this arrangement is that articles to be segregated cascade downwardly from the uppermost segregation belt 32 to the lowermost belt 35 and progressively larger articles are segregated out as the articles are moved over the upper reaches of successive belts. It is again noted that each of the segregation belts in the embodiment illustrated is provided with openings progressively larger than those in the segregation belt thereabove.

The driving mechanism for the segregator 10 is best illustrated in FIG. 12. From this figure it can be seen that two prime movers in the form of electric motors 134 and 135 are mounted on the support frame. The motor 134 has disposed on the output shaft thereof a sprocket 136, which sprocket is coupled in driving relationship to the sprocket 127 through a chain 137. Thus, the motor 134 functions to impart oscillation movement to the trays 116, as was described previously with respect to FIG. 11.

The output shaft of the motor 135 has disposed thereon a drive sprocket 140, which sprocket is coupled in driving relationship with an intermediate drive shaft 141 through a sprocket 142 mounted on the shaft and a connecting chain 143. The intermediate drive shaft 141 has secured to one end thereof a sprocket 144, which sprocket is coupled in driving engagement with a sprocket 145 mounted on another drive shaft 146. The latter engagement is provided by a chain 147. Both of the shafts 141 and 146 are journaled to the support frame in substantially parallel relationship by bearing elements 150 (see FIG. 1). The ends of the drive shafts 141 and 146 opposite the chain 147 have secured thereto drive sprockets 151 and 152, respectively. The sprocket 151 is coupled in driving relationship with the segregation belt sprockets 87 through a chain 149 trained over these sprockets and an idling sprocket 153 mounted on the support frame. As can be seen from FIG. 12, the chain 149 is trained over opposite sides of the adjacent sprockets 87 so that motion imparted to adjacent belts is in opposite directions, as indicated by the arrow lines in FIG. 1. At this point, it is noted that the aforedescribed opposed arrangement of adjacent belts results in driving of adjacent belts by opposite drums. Specifically, the belts 32 and 34 are driven by drums 36 through intermediate belts 59, whereas the belts 33 and 35 are driven directly by the drums 37.

The beater elements 90 are driven by the shaft 146 through means of the sprocket 152 thereon; a chain 154 trained over the sprocket; an idler sprocket 155 mounted on the support frame; and the sprockets 93 (see FIG. 12). Turning of the beater elements relative to the segregation belt movement, as illustrated in FIG. 7, is accomplished by lacing the chain 154 on opposite sides of the sprockets of adjacent belts. It is noted that in the preferred form of the invention illustrated, the beater elements have a tangential component of velocity at contact with the segregation belts which extends in the direction of belt movement. Through the chain drive arrangement for the beater elements, beater speed and resulting belt oscillation of impulse frequency can be controlled simply by varying the diameters of the sprocket 152 and/or the sprockets 93. This control can, naturally, be effected independent of the segregation belt speed.

Referring now to FIGS. 2 and 3, therein is illustrated the preferred construction of the segregation belts 32–35. This construction comprises a series of identical segments 156 of generally zigzag configuration coupled together by transversely extending rods 157 extending through aligned apertures therein. As so assembled, the belts define a gridwork having a plurality of openings separated by the links, which openings are divided in two by transversely extending rods 160 extending through apertures in the segments intermediate the connected end portions thereof. As can be seen from FIG. 3, the rods 160 are so positioned relative to the segments 156 and the connecting rods 157 therefor as to define therewith openings having substantially corresponding diagonal dimensions D. These dimensions are, naturally, the maximum dimensions of the openings and, accordingly, control the grading action of the belt. In the preferred embodiment illustrated for use in segregating shelled almonds, the dimension D corresponds substantially to the width of the shelled almonds desired to be graded out on the belt. For the sake of illustration, the shelled almonds have been designated in FIGS. 2, 3, and 4 by the numeral 161 and are shown as having a width W, thickness T, and length L.

Referring now specifically to FIG. 4, therein is illustrated an alternative construction of segregation belt 162 adapted to be substituted in the segregator 10 for the form of belt described above with reference to FIGS. 2 and 3. The belt 162 is comprised of a series of links formed of rods 163 having ends 164 hooked over each other so that each rod is pivotal about the axis defined by the rod or rods adjacent thereto. Although only one side of the belt 162 has been illustrated, it is to be understood that both sides correspond in construction.

The segregating function of the belt 162 differs from that of the belts 32–35 primarily in that articles, such as the shelled almonds illustrated, are segregated on the basis of their thickness, rather than width. Specifically, the rods 163 of the belt are spaced apart a distance A corresponding to or greater than the thickness of the shelled almond desired to be segregated out. It is to be understood that when the belts 162 are incorporated into the segregator 10, the dimension A of successive belts would preferably increase progressively from top to bottom so that nuts of increasing size will be segregated out on each successively lower belt.

From the aforedescribed description of the belts 32–35 and 162, it will be appreciated that these belts are adapted to segregate shelled almonds, or similarly characterized articles, on the basis of their minor dimensions of width and thickness, respectively, as contrasted to their major dimensions of length. In actuality, this means that the openings in the belts 32–35 are adapted to pass the segregated nuts therethrough endwise, whereas the openings in the belt 162 are adapted to pass the segregated nuts therethrough edgewise. In neither case, however, are openings provided of sufficient size to permit the graded nuts to pass therethrough sideways. This is particularly advantageous since an opening sufficient to permit graded nuts to pass therethrough sideways would also be large enough to permit endwise and edgewise passage of nuts therethrough, even though the nuts might possibly have side dimensions exceeding those of the nuts desired to be graded out. Naturally, the latter type of opening and the type of nut passage permitted thereby would result in inconsistent segregation.

The segregator 10 is especially well suited for endwise or edgewise segregation with the aforedescribed segregation belts because the controlled oscillating action provided thereby functions to orientate the nuts or other articles being segregated in endwise or edgewise fashion. This is necessary because nuts or other articles of shelled almond shape tend naturally to lie on their sides, in which condition they cannot pass through openings designed to facilitate their endwise or edgewise passage therethrough.

From the foregoing description, the operation of the segregator 10 is believed apparent. Specifically, the nuts to be segregated are first loaded onto the belt 32 through means of the loading chute 31. These nuts are then translated back and forth across the segregator, simultaneously with oscillation thereof, by movement of the belts 32–35. Simultaneously with this action, segregated nuts are received in the trays 116 and conveyed to suitable receptacles (not illustrated). After the nuts have passed over the lowermost belt 35, oversized nuts and any large debris, such as shells, are directed into a suitable receptacle (not illustrated) by the lowermost chute 114.

From the foregoing description, it is believed apparent that the present invention provides for the attainment of the objects initially set forth herein. It is to be understood, however, that the invention is not intended to be limited to the specific details of the embodiment herein described, and the specific exemplary application thereof to the segregation of almonds, but rather is defined by the following claims.

What is claimed is:
1. In a segregating machine comprising:
  (a) a support frame;
  (b) a pair of cylindrical drums secured to said frame in horizontally spaced relationship with the axes thereof substantially parallel, said drums being rotatable about the respective axes thereof;
  (c) a continuous segregation belt trained around said drums with the upper reach thereof in substantially horizontally disposed relationship, said belt having disposed therethrough a plurality of openings through which articles of a predetermined size or less are adapted to pass;
  (d) drive means to continuously move said belt in one direction around said rollers;
  (e) loading means to deposit articles to be segregated on the upper reach of said belt for movement therewith between said drums; and,
  (f) collection means disposed between said drums beneath the upper reach of said belt to catch articles which pass through the openings therein;
the improvement comprising:
    (1) motion imparting means engaging the upper reach of said belt between said drums at least at one point to impart oscillating movement thereto;
    (2) damping means engaging the upper reach of said belt between said drums at a point in spaced relationship to said one point to damp the oscillating movement imparted to said reach by said motion imparting means; and,
    (3) control means to selectively vary the spaced relationship of the points of said upper reach engaged by said motion imparting and damping means.

2. An improvement according to claim 1, wherein:
  (a) said motion imparting means comprises at least one beater element secured to the support frame for rotation about an axis substantially parallel to the axes of said drums, said element having an irregular peripheral surface engaging the upper reach of said belt, adapted, upon rotation of said element, to impart said oscillating movement to said reach; and,
  (b) said damping means comprises at least one roller secured to said support frame for rotation about an axis substantially parallel to the axes of said drums, said roller having a smooth peripheral surface engaging the upper reach of said belt so that movement of said belt in said one direction imparts rotation to said roller.

3. An improvement according to claim 2, including beater drive means to rotate said beater element about the axis thereof independent of the movement of said belt.

4. An improvement according to claim 2, wherein said control means comprises a mounting securing said roller to said frame for movement towards and away from said beater element.

5. An improvement according to claim 2, including:
  (a) first means securing said beater element to said frame for selective movement towards and away from the upper reach of said belt; and,
  (b) second means securing said roller to said frame for selective movement towards and away from the upper reach of said belt.

6. An improvement according to claim 2, wherein said beater element and roller are disposed beneath the upper reach of said belt in a confined area adjacent one edge thereof and further including:
  (a) a shield extending over said reach in juxtaposition thereto above said confined area; and,
  (b) means securing said shield to said frame for oscillating up and down movement with said upper reach.

7. An improvement according to claim 6, wherein:
  (a) said shield is fabricated of resilient material adapted to deflect responsive to oscillating movement of said belt;
  (b) said shield functions to damp oscillating movement imparted to said belt; and,
  (c) the damping action of said shield may be selectively controlled by varying the disposition thereof relative to said belt and the resiliency of said material.

8. In a segregating machine according to claim 1, wherein said collection means comprises a tray having a discharge opening at one side thereof, the improvement further including means to oscillate said tray to move articles received therein to said opening.

9. In a segregating machine according to claim 1, wherein:
  (a) said drive means continuously moves the upper reach of said belt from one of said drums towards the other;
  (b) said loading means deposits articles to be segregated on said upper reach at an area adjacent said one drum; and,
  (c) oversized articles deposited on said reach discharge therefrom as said belt passes around said other drum;
the improvement further comprising ejection means to forceably discharge oversized articles from the openings in said belt, comprising:
    (1) an intermediate drum secured to said frame for rotation about an axis parallel to that of said other drum with the upper surface thereof in substantially the same horizontal plane as that of the upper surface of said other drum, said intermediate drum being disposed adjacent said other drum and having a substantially smaller diameter; and,
    (2) an intermediate continuous belt of substantially the same width as said segregation belt trained around said other and intermediate drums beneath said drums beneath said segregation belt.

10. An improvement according to claim 9, including:
(a) first adjustment means securing said other and intermediate drums to said frame for selective and simultaneous movement towards and away from said one drum to effect tension adjustment of said segregation belt without effecting tension adjustment of said intermediate belt; and,
(b) second adjustment means securing said intermediate drum to said frame for selective independent movement towards and away from said other drum to effect tension adjustment of said intermediate belt without effecting tension adjustment of said segregation belt.

11. An improvement according to claim 9 including a surface secured to said frame beneath the area of said upper reach upon which said loading means deposits articles to be segregated, said surface being juxtaposed to the undersurface of said reach.

12. An improvement according to claim 11, wherein said surface comprises a plate disposed adjacent said one drum in slidable relationship to the undersurface of said reach, the improvement further comprising:
(a) third adjustment means securing said one drum and said plate to said frame for selective and simultaneous movement towards and away from said other drum to effect tension adjustment of said segregation belt without varying the distance between said one drum and plate; and,
(b) fourth adjustment means securing said plate to said frame for selective independent movement towards and away from said one drum to effect adjustment of the distance between said plate and one drum without effecting the adjustment of said segregation belt.

13. An improvement according to claim 12, including:
(a) fifth adjustment means securing said other drum to said frame for selective independent movement towards and away from said intermediate drum to simultaneously effect tension adjustment of said segregation and intermediate belts; and,
(b) sixth adjustment means securing said one drum to said frame for selective and independent movement towards and away from said plate to simultaneously effect tension adjustment of said segregation belt and adjustment of the distance between said plate and one drum.

14. A continuous belt structure, comprising:
(a) a support frame;
(b) a primary belt supporting cylindrical drum mounted for rotation about the axis thereof on said frame;
(c) secondary belt supporting means spaced from said primary drum;
(d) a major continuous belt trained around said primary drum and said secondary support means;
(e) an intermediate drum mounted on said frame between said primary drum and secondary support means for rotation about an axis parallel to that of said primary drum;
(f) an intermediate continuous belt trained around said primary and intermediate drums beneath said major belt;
(g) first adjustment means securing said primary and intermediate drums to said frame for selective and simultaneous movement towards and away from said secondary support means to effect tension adjustment of said major belt without effecting tension adjustment of said intermediate belt; and,
(h) second adjustment means securing said intermediate drum to said frame for selective independent movement towards and away from said primary drum without effecting tension adjustment of said major belt.

15. A structure according to claim 14, wherein said secondary belt supporting means comprises:

(a) a secondary cylindrical drum mounted for rotation about the axis thereof on said frame, said axis being parallel to that of said primary drum; and,
(b) a plate mounted on said frame in juxtaposed slidable relationship to the interior surface of one reach of said major belt, said plate being disposed adjacent to said secondary drum.

16. A structure according to claim 15, including:
(a) third adjustment means securing said secondary drum and said plate to said frame for selective and simultaneous movement towards and away from said primary drum to effect tension adjustment of said major belt without varying the distance between said secondary drum and plate; and,
(b) fourth adjustment means securing said plate to said frame for selective independent movement towards and away from said secondary drum to effect adjustment of the distance between said plate and secondary drum without effecting tension adjustment of said major belt.

17. A structure according to claim 16, including adjustment means securing said secondary drum to said frame for selective independent movement towards and away from said plate to simultaneously effect tension adjustment of said major belt and adjustment of the distance between said plate and secondary drum.

18. A structure according to claim 14, including adjustment means securing said primary drum to said frame for selective independent movement towards and away from said intermediate drum to simultaneously effect tension adjustment of said major and intermediate belts.

19. A segregating machine, comprising:
(a) a support frame;
(b) first and second pairs of drums secured to said frame in vertically spaced substantially aligned relationship with said first pair being disposed above said second pair, the drums in each of said pairs being horizontally spaced from each other with the axes thereof substantially parallel, said drums being rotatable about the respective axes thereof;
(c) first and second continuous segregation belts trained around said respective first and second pairs of drums with the upper reaches thereof in substantially horizontally disposed relationship and wherein:
(1) said first belt has disposed therethrough a plurality of openings through which articles of a first predetermined size or less are adapted to pass; and,
(2) said second belt has disposed therethrough a plurality of openings through which articles of a second predetermined size or less are adapted to pass, said second predetermined size being larger than said first predetermined size;
(d) drive means to continuously move said first and second belts in substantially opposite directions around said respective first and second pairs of rollers whereby the downstream end of the upper reach of said first belt is disposed above the upstream end of the upper reach of said second belt;
(e) first loading means to direct articles to be segregated onto the upper reach of said first belt for movement therewith between said first pair of drums and discharge over the downstream end of said reach;
(f) second loading means adapted to direct articles discharged over the downstream end of the upper reach of said first belt onto the upper reach of said second belt for movement therewith between said second pair of drums; and,
(g) first and second collection means disposed directly beneath the upper reaches of said first and second belts, respectively, to catch articles which pass through the openings therein.

20. A method of segregating articles according to size, comprising:
  (a) depositing said articles on the upper reach of a substantially horizontally disposed continuous belt having openings therein through which articles of a predetermined size or less are adapted to pass;
  (b) translating the upper reach of said belt to move said articles thereacross;
  (c) imparting oscillations to at least one first localized area of said upper reach simultaneously with the translating thereof to orientate articles deposited thereon;
  (d) damping said upper reach to effect control of the energy level of oscillations imparted thereto by physically contacting at least one second localized area spaced from said first localized area, said damping being selectively controllable by varying the relative locations of said localized areas relative to each other and said upper reach; and
  (e) collecting the articles which pass through the openings in said belt.

21. In a segregating machine comprising:
  (a) a support frame;
  (b) a pair of cylindrical drums secured to said frame in horizontally spaced relationship with the axes thereof substantially parallel, said drums being rotatable about the respective axes thereof;
  (c) a continuous segregation belt trained around said drums with the upper reach thereof in substantially horizontally disposed relationship, said belt having disposed therethrough a plurality of openings through which articles of a predetermined size or less are adapted to pass;
  (d) drive means to continuously move said belt in one direction around said rollers;
  (e) loading means to deposit articles to be segregated on the upper reach of said belt for movement therewith between said drums; and,
  (f) collection means disposed between said drums beneath the upper reach of said belt to catch articles which pass through the openings therein;
  the improvement comprising:
    (1) motion imparting means engaging the upper reach of said belt to impart oscillating movement thereto; and,
    (2) damping means comprising at least one shield secured to said frame and extending into juxtaposed physical contact with an edge portion of said upper reach to dampen oscillating movement imparted thereto.

22. An improvement according to claim 21, wherein:
  (a) said damping means comprises a pair of resilient shields extending, respectively, over the opposite edge portions of said upper reach in juxtaposition to the upper surface thereof; and,
  (b) the damping action of said shields may be selectively controlled by varying the disposition thereof relative to said belt and the resiliency thereof.

23. A method of segregating articles according to size, comprising
  (a) depositing said articles on the upper reach of a substantially horizontally disposed continuous belt having openings therein through which articles of a predetermined size or less are adapted to pass;
  (b) translating the upper reach of said belt to move said articles thereacross;
  (c) imparting oscillations to the upper reach of said belt simultaneously with the translating thereof to orientate the articles deposited thereon;
  (d) damping said upper reach to effect control of the energy level of oscillations imparted thereto by physically contacting at least one edge portion thereof with a shield extending in juxtaposition thereto; and,
  (e) collecting the articles which pass through openings in said belt.

24. A method according to claim 23 wherein said damping is effected by extending a pair of resilient shields, respectively, over the opposite edge portions of said upper reach in juxtaposition to the upper surface thereof.

References Cited
UNITED STATES PATENTS 2,546,713   3/1951   Baldwin _________ 209—125 X M. HENSON WOOD, Jr., *Primary Examiner.*

R. A. SCHACHER, *Assistant Examiner.*